US012043578B1

(12) United States Patent
Peters et al.

(10) Patent No.: US 12,043,578 B1
(45) Date of Patent: *Jul. 23, 2024

(54) HIGH-STRENGTH FLOWABLE FILL COMPOSITIONS

(71) Applicant: J&P Invesco LLC, Schertz, TX (US)

(72) Inventors: Stanley R. Peters, Castle Rock, CO (US); George C. Geal, III, Parker, CO (US); Paul A. Karam, San Antonio, TX (US)

(73) Assignee: J&P INVESCO LLC, Schertz, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/876,840

(22) Filed: Jul. 29, 2022

Related U.S. Application Data

(63) Continuation of application No. 17/007,990, filed on Aug. 31, 2020, now Pat. No. 11,434,169, which is a continuation-in-part of application No. 16/394,295, filed on Apr. 25, 2019, now Pat. No. 10,919,807.

(60) Provisional application No. 62/894,555, filed on Aug. 30, 2019, provisional application No. 62/662,483, filed on Apr. 25, 2018.

(51) Int. Cl.
| | |
|---|---|
| *C04B 28/04* | (2006.01) |
| *C04B 14/06* | (2006.01) |
| *C04B 16/06* | (2006.01) |
| *C04B 22/12* | (2006.01) |
| *C04B 24/38* | (2006.01) |
| *C04B 103/10* | (2006.01) |
| *C04B 111/00* | (2006.01) |
| *C04B 111/21* | (2006.01) |
| *C04B 111/27* | (2006.01) |

(52) U.S. Cl.
CPC .............. *C04B 28/04* (2013.01); *C04B 14/06* (2013.01); *C04B 16/0633* (2013.01); *C04B 22/124* (2013.01); *C04B 24/383* (2013.01); *C04B 2103/10* (2013.01); *C04B 2111/00663* (2013.01); *C04B 2111/21* (2013.01); *C04B 2111/27* (2013.01); *C04B 2201/50* (2013.01)

(58) Field of Classification Search
CPC ..... C04B 28/04; C04B 14/06; C04B 16/0633; C04B 22/124; C04B 24/383; C04B 2103/10; C04B 2111/00663; C04B 2111/21; C04B 2111/27; C04B 2201/50
See application file for complete search history.

(56) References Cited

U.S. PATENT DOCUMENTS

| | | |
|---|---|---|
| 1,782,471 A | 11/1930 | Kirchener |
| 1,968,152 A | 7/1934 | Kirchener |
| 2,307,485 A | 1/1943 | Booth |
| 2,434,301 A | 1/1948 | Wertz |
| 2,600,018 A | 6/1952 | Nelson et al. |
| 2,806,531 A | 9/1957 | Morgan et al. |
| 2,819,171 A | 1/1958 | Benedict et al. |
| 2,820,713 A | 1/1958 | Wagner |
| 2,890,965 A | 6/1959 | Underdown et al. |
| 3,008,843 A | 11/1961 | Jolly |
| 3,427,175 A | 2/1969 | Angstadt et al. |
| 4,032,353 A | 6/1977 | Ball |
| 4,042,408 A | 8/1977 | Murray et al. |
| 4,209,336 A | 6/1980 | Previte |
| 4,264,367 A | 4/1981 | Schutz |
| 4,444,593 A | 4/1984 | Schutz |
| 5,106,422 A | 4/1992 | Bennett et al. |
| 5,211,751 A | 5/1993 | Arfaei et al. |
| 5,378,278 A | 1/1995 | Colburn |
| 5,728,209 A | 3/1998 | Bury |
| 5,785,751 A | 7/1998 | Bashlykov et al. |
| 6,485,561 B1 | 11/2002 | Dattel |
| 6,648,962 B2 | 11/2003 | Berke et al. |
| 6,869,474 B2 | 3/2005 | Perez-Pena et al. |
| 6,890,382 B2 | 5/2005 | Zampieri |
| 6,913,645 B2 | 7/2005 | McNulty, Jr. |
| 7,029,527 B2 | 4/2006 | Gaudry et al. |
| 7,427,321 B2 | 9/2008 | Hilton et al. |
| 7,670,427 B2 | 3/2010 | Perez-Pena et al. |
| 7,842,348 B2 | 11/2010 | Abbott et al. |
| 8,167,998 B2 | 5/2012 | Ladely et al. |
| 8,747,547 B1 | 6/2014 | Peters et al. |

(Continued)

FOREIGN PATENT DOCUMENTS

| | | |
|---|---|---|
| BE | 508098 A1 | 1/1952 |
| BE | 582948 A1 | 1/1960 |

(Continued)

OTHER PUBLICATIONS

ARG Roving Specification, Nippon Electric Glass Co., Ltd, Kanzaki, Shiga, Japan, Feb. 5, 2001, version 2, 1 page.
BCSA is a stand-alone rapid-setting Cement, PP composition, 2018, Eupave, 1 page.
Bost et al., "Comparison of the accelerating effect of various additions on the early hydration of Portland cement," Construction and Building Materials, Jun. 15, 2016, 2 pages.

(Continued)

*Primary Examiner* — Anthony J Green
(74) *Attorney, Agent, or Firm* — MERCHANT & GOULD P.C.

(57) ABSTRACT

High-strength flowable fill compositions are disclosed. The compositions include cement, aggregate (e.g., sand), water, coloring agent, polymer, and fibers. In an embodiment, the compositions include an accelerant, e.g., calcium chloride or sodium bicarbonate and/or an air entraining agent. In an embodiment, the compositions include a water-proofing agent to eliminate efflorescence. The compositions have a compressive strength of between 300 psi and 3000 psi after 1 day, a compressive strength of between 900 psi and 4000 psi after 7 days, and a compressive strength of between 1200 psi and 5000 psi after 28 days.

20 Claims, No Drawings

(56) References Cited

U.S. PATENT DOCUMENTS

| | | | |
|---|---|---|---|
| 8,822,567 | B2 | 9/2014 | Kono et al. |
| 9,028,606 | B2 | 5/2015 | Andersen |
| 9,038,719 | B2 | 5/2015 | Crews |
| 9,090,508 | B2 | 7/2015 | Gong |
| 10,239,790 | B2 | 3/2019 | Byrd |
| 10,322,971 | B1 | 6/2019 | Geal, III et al. |
| 10,571,045 | B2 | 2/2020 | Pino, Jr. et al. |
| 10,571,047 | B2 | 2/2020 | Pino, Jr. et al. |
| 10,641,414 | B2 | 5/2020 | Pino, Jr. et al. |
| 10,843,968 | B1 | 11/2020 | Geal |
| 10,851,016 | B1 | 12/2020 | Peters |
| 10,919,807 | B1 | 2/2021 | Karam |
| 11,247,942 | B1 | 2/2022 | Geal |
| 11,434,169 | B1 | 9/2022 | Peters |
| 11,440,841 | B1 | 9/2022 | Peters |
| 2002/0117088 | A1 | 8/2002 | Norman et al. |
| 2003/0041785 | A1 | 3/2003 | Harrison |
| 2005/0103234 | A1 | 5/2005 | McNulty |
| 2008/0227891 | A1 | 9/2008 | Jarvie et al. |
| 2009/0114126 | A1 | 5/2009 | Roddy et al. |
| 2009/0158960 | A1 | 6/2009 | Andersen |
| 2009/0158965 | A1 | 6/2009 | Andersen |
| 2009/0158967 | A1 | 6/2009 | Andersen |
| 2010/0064943 | A1 | 3/2010 | Guevara et al. |
| 2010/0095871 | A1 | 4/2010 | Patil et al. |
| 2011/0021668 | A1 | 1/2011 | Hamai et al. |
| 2012/0037046 | A1 | 2/2012 | Rolland et al. |
| 2012/0040165 | A1 | 2/2012 | Dubey |
| 2012/0196046 | A1 | 8/2012 | Nicoleau |
| 2013/0008354 | A1 | 1/2013 | Constantz |
| 2013/0087075 | A1 | 4/2013 | Massa |
| 2014/0083698 | A1 | 3/2014 | Stone et al. |
| 2014/0138007 | A1 | 5/2014 | Dubey et al. |
| 2014/0311387 | A1 | 10/2014 | Hohn et al. |
| 2015/0175887 | A1 | 6/2015 | Welker |
| 2015/0240163 | A1 | 8/2015 | Welker |
| 2015/0291476 | A1 | 10/2015 | Al-Mutlaq |
| 2018/0106015 | A1 | 4/2018 | Pino et al. |
| 2018/0156357 | A1 | 6/2018 | Pino et al. |
| 2020/0149659 | A1 | 5/2020 | Pino, Jr. et al. |
| 2020/0149660 | A1 | 5/2020 | Pino, Jr. et al. |
| 2020/0200292 | A1 | 6/2020 | Pino, Jr. et al. |

FOREIGN PATENT DOCUMENTS

| | | |
|---|---|---|
| CA | 412214 A | 5/1943 |
| CA | 419133 A | 3/1944 |
| CA | 419134 A | 3/1944 |
| CA | 419135 A | 3/1944 |
| CA | 462493 A | 1/1950 |
| CA | 520832 A | 1/1956 |
| CA | 566361 A | 11/1958 |
| CA | 607361 A | 10/1960 |
| CA | 607391 A | 10/1960 |
| CA | 625024 A | 10/1960 |
| CA | 713618 A | 7/1965 |
| CA | 900635 A | 5/1972 |
| CA | 1204456 | 5/1986 |
| CN | 101670619 A | 3/2010 |
| DE | 1807608 A1 | 6/1970 |
| EP | 114448 A1 | 8/1984 |
| EP | 127960 A1 | 12/1984 |
| EP | 402306 A1 | 12/1990 |
| EP | 2520553 A1 | 11/2012 |
| EP | 1532080 B2 | 3/2014 |
| EP | 2832706 A1 | 2/2015 |
| EP | 2414301 B2 | 11/2015 |
| FR | 38549 E | 6/1931 |
| FR | 1591415 A | 4/1970 |
| FR | 2061507 A2 | 6/1971 |
| GB | 301509 A | 1/1930 |
| GB | 430781 A | 6/1935 |
| GB | 791622 A | 3/1958 |
| GB | 833071 A | 4/1960 |
| GB | 1181331 A | 2/1970 |
| GB | 1315225 A | 5/1973 |
| IN | 154852 A1 | 12/1984 |
| IN | 159750 A1 | 6/1987 |
| JP | 06040756 A | 2/1994 |
| JP | 06298552 A | 10/1994 |
| JP | 08029963 B2 | 3/1996 |
| JP | 2802972 B2 | 9/1998 |
| JP | 11217253 A | 8/1999 |
| JP | 2000007402 A | 1/2000 |
| JP | 200095554 A | 4/2000 |
| JP | 3125316 B2 | 1/2001 |
| JP | 2004002080 A | 1/2004 |
| JP | 3558730 B2 | 8/2004 |
| JP | 2005324982 A | 11/2005 |
| JP | 2006298661 A | 11/2006 |
| JP | 4157485 B2 | 10/2008 |
| JP | 4290628 B2 | 7/2009 |
| JP | 4348001 B2 | 10/2009 |
| JP | 2010150105 A | 7/2010 |
| JP | 4626541 B2 | 2/2011 |
| JP | 4705455 B2 | 6/2011 |
| JP | 4725742 B2 | 7/2011 |
| JP | 4813822 B2 | 11/2011 |
| JP | 4837161 B2 | 12/2011 |
| JP | 4860396 B2 | 1/2012 |
| JP | 4877886 B2 | 2/2012 |
| JP | 5051990 B2 | 10/2012 |
| JP | 5113496 B2 | 1/2013 |
| JP | 2013170436 | 9/2013 |
| JP | 2013077378 A1 | 4/2015 |
| JP | 2015124141 A | 7/2015 |
| JP | 2015229684 A | 12/2015 |
| KR | 100311286 B2 | 9/2001 |
| KR | 1020120016432 A | 2/2012 |
| LU | 57288 A1 | 2/1969 |
| RU | 2099302 C1 | 12/1997 |
| RU | 2102356 C1 | 1/1998 |
| RU | 2119900 C1 | 10/1998 |
| RU | 2186942 C1 | 8/2002 |
| RU | 2257294 C1 | 7/2005 |
| RU | 2337124 C1 | 10/2008 |
| RU | 2434923 C1 | 11/2011 |
| RU | 2470979 C1 | 12/2012 |
| RU | 2497861 C1 | 11/2013 |
| RU | 2525408 C1 | 8/2014 |
| RU | 2542063 C1 | 2/2015 |
| RU | 2545208 C1 | 3/2015 |
| RU | 2553807 C1 | 6/2015 |
| RU | 2555683 C1 | 7/2015 |
| SU | 848594 A1 | 7/1981 |
| SU | 876960 A1 | 10/1981 |
| SU | 1411439 A1 | 7/1988 |
| SU | 1435762 A1 | 11/1988 |
| SU | 1585309 A1 | 8/1990 |
| SU | 1682531 A1 | 10/1991 |
| WO | 8601795 A1 | 3/1986 |
| WO | 0051947 A1 | 9/2000 |
| WO | 2008130107 A1 | 10/2008 |
| WO | 2010047919 A1 | 4/2010 |
| WO | 2011139466 A1 | 11/2011 |
| WO | 2012136963 A1 | 10/2012 |
| WO | 2014068409 A2 | 5/2014 |
| WO | 2014072533 A1 | 5/2014 |
| WO | 2015034531 A1 | 3/2015 |
| WO | 2015034543 A1 | 3/2015 |
| WO | 2015130284 A1 | 9/2015 |
| WO | 2016043500 A1 | 3/2016 |

OTHER PUBLICATIONS

Chryso Turbocast NCT, concrete admixture, Safety Data Sheet, according to Federal Register, vol. 77, No. 58, Monday, Mar. 26, 2012, pp. 1-5.

Chryso, Material Safety Data Sheet, Chryso Plast P150, Revision Date Jun. 26, 2009, 5 pages.

Fibercast, by Propex, Product Data, Fibercast 500, PCS-1156E-002 (Mar. 2017), 2 pages.

(56) References Cited

OTHER PUBLICATIONS

Juenger et al., "A soft X-ray microscope investigation into the effects of calcium chloride on tricalcium silicate hydration," Cement and Concrete Research, Jan. 1, 2005, 2 pages.

Kosmatka et al., "Design and Control of Concrete Mixtures," The guide to applications, methods, and materials, 15th edition, Engineering Bulletin 001, Portal Cement Association, 2011, p. 91.

Liquid Calcium chloride, Product Data Sheet, Tetra Chemicals, 2004, 1 page.

Odler et al., "On the combined effect of water solubles lignosulfonates and carbonates on portland cement and clinker pastes 1. Physical properties," Cement and Concreate Research, Jul. 1, 1978, 2 pages.

Rapid Set Cement, Fast Setting Hydraulic Cement, Manufacturer: CTS Cement Manufacturing Corp., 1982, 1 page.

Rapp, "Effect of Calcium Chloride On Portland Cements and Concretes," Journal of Research of the National Bureau of Standars, Apr. 1, 1935, 2 pages.

Reddy, V. Venkateswarna et al., "Influence of strong alkaline substances (sodium carbonate and sodium bicarbonate) in mixing water on strength and setting properties of concrete", Indian Journal of Engineering & Materials Sciences, vol. 13, Apr. 2006, pp. 123-128.

Rosenberg, "Study of the Mechanism Through Which Calcium Chloride Accelerates the Set of Portland," Oct. 1, 1964, 2 pages.

Safety Data Sheet, Rapid Set, CTS cement, Version No. 2, revision date Issue date Jan. 27, 2018, pp. 1-7.

Surecrete Design Products, Inc., Safety Data Sheet, TruTique—Integral Color (Gun Metal), revision date Jan. 1, 2017, 7 pages.

Western Material & Design, LC, FasTrac 400, vol. Mar. 2018, 2 pages.

Williams et al., "Developing Mixture Proportion Guidance for Field-Prepared Rapid-Setting Materials for Emergency Airfield Repairs," Feb. 8, 2012, 2 pages.

Witlbank et al., "Effect of Selected Accelerants on the Physical Properties of Mineral Trioxide Aggregate and Portland Cement," Journal of Endodontics, Oct. 1, 2007, 2 pages.

HIGH-STRENGTH FLOWABLE FILL COMPOSITIONS

RELATED APPLICATIONS

This application is a continuation of U.S. patent application Ser. No. 17/007,990, filed on Aug. 31, 2020, (now issued as U.S. Pat. No. 11,434,169 on Sep. 6, 2022), which is a continuation-in-part from and claims priority to U.S. patent application Ser. No. 16/394,295, filed Apr. 25, 2019, (now issued as U.S. Pat. No. 10,919,807 on Feb. 16, 2021), which claims priority to U.S. Provisional Patent Application Ser. No. 62/662,483, filed Apr. 25, 2018, which are fully incorporated herein by reference. This application also claims priority to U.S. Provisional Patent Application Ser. No. 62/894,555, filed Aug. 30, 2019, which is fully incorporated herein by reference.

INTRODUCTION

Demands of construction and opening roadways to traffic have accelerated in the last several years. Contractors are pressured to backfill a construction trench in much less time than was traditionally required.

The present disclosure generally relates to high-strength flowable fill compositions that include fibers, polymers, and/or coloring agents for rapid utility trench filling in streets and roadways. In some embodiments a composition may further include water-proofing admixture to decrease or eliminate efflorescence. The disclosed compositions can set fast, do not require a pavement patch, are durable, and are non-segregating.

SUMMARY

The present disclosure identifies a high-strength flowable fill composition for backfilling a void comprising between 60% and 90% aggregate by weight of the composition; between 3% and 30% cement by weight of the composition; between 5% and 25% water by weight of the composition; between 0.05% and 5.0% coloring agent by weight of the composition; between 0.01% and 2.0% polymer by weight of the composition; and between 0.01% and 1.0% fibers by weight of the composition. The composition having a compressive strength of between 300 psi and 3000 psi after 1 day, a compressive strength of between 900 psi and 4000 psi after 7 days, and a compressive strength of between 1200 psi and 5000 psi after 28 days.

The aggregate in some disclosed compositions may be fine aggregate, coarse aggregate, micro aggregate (e.g., Bag House Fines), sand, recycled trench spoils, screened native soils, recycled materials or some combination thereof. In certain compositions, an accelerant may be included. The cement in certain composition may be Portland cement, or commercially available cement called FasTrac or RapidSet. The accelerant may be calcium chloride, sodium bicarbonate, non-chloride accelerator (NCA), or some combination thereof. The polymer in some disclosed compositions may be hydroxypropyl methylcellulose. The coloring agent in certain compositions may be black to match the color of asphalt. The fibers in certain compositions may be made from polypropylene and may in certain embodiments vary in length.

The present disclosure also identifies a method of backfilling a trench comprising excavating the trench, mixing a composition of the present disclosure using aggregate excavated from the trench (recycled spoils), and filling the trench with a composition of the present disclosure that includes aggregate excavated from the trench (recycled spoils).

While the disclosure will be described with respect to preferred embodiment configurations and with respect to particular compositions or methods used therein, it will be understood that the disclosure is not to be construed as limited in any manner by either such configuration or components described herein. Also, while the particular types of equipment, compositions and uses are described herein, it will be understood that such particular compositions, equipment or uses are not to be construed in a limiting manner. Instead, the functionality of those compositions and methods should be appreciated. These and other variations of the disclosure will become apparent to those skilled in the art upon a more detailed description of the disclosure.

The advantages and features which characterize the disclosure are pointed out with particularity in the claims annexed hereto and forming a part hereof. For a better understanding of the disclosure, however, reference should be had to the examples, which form a part hereof and to the accompanying descriptive matter, in which there is illustrated and described embodiments of the disclosure. The provisional applications to which this application claims priority to are incorporated herein in their entirety.

DETAILED DESCRIPTION

The present disclosure provides compositions and methods for backfilling micro- or nano-trenches with a high-strength flowable fill composition that does not require a pavement patch and is resistant to freeze thaw cycles. A micro-trench is generally a trench that is between about 0.75 inches and about 2.0 inches in width but can be larger. A nano-trench is generally a trench that is less than about 0.75 inches in width but can be larger.

Generally, one must consider several factors when determining an appropriate composition for backfilling a nano- or micro-trench or void in the middle of a public roadway or street. These factors include the flowability or spread of the flowable fill, the setting time of the flowable fill, the final compressive strength of the flowable fill, the durability of the flowable fill, the aesthetics of the flowable fill, the consolidation of the composition, and the segregation of the composition.

For example, strength development in backfilling compositions is directly related to the amount of cementitious material, aggregate, and water content. In an embodiment of this disclosure, the primary cementitious material is Portland cement. In an embodiment of this disclosure, the aggregate may be fine aggregate, coarse aggregate, micro aggregate, sand, recycled spoils, or some combination thereof. Water content of the composition also influences strength development as the addition of water controls flowability or slump. In certain embodiments, a composition should not be greater than 3000 psi at 28 days. Because compositions of the present disclosure are often used for backfilling nano- or micro-trenches, the ability to reexcavate the flowable fill at a later date is of less concern, i.e., the final compressive strength can be high.

In some embodiments of the present disclosure, the flowability may be determined using ASTM D6103, e.g., utilizing a moistened 3 inch diameter by 6 inch high open-ended cylinder filled with a composition. Along with strength development and flowability, setting time is an additional factor to consider when determining a suitable composition. The faster the composition sets and gains strength after filling the void, the sooner the backfilled surface may be returned to normal use.

An embodiment of the present disclosure includes a high-strength flowable fill composition for backfilling a void comprising between 55% and 75% aggregate by weight of the composition; between 10% and 25% cement by weight of the composition; between 5% and 20% water by weight of the composition; between 0.05% and 5.0% coloring agent by weight of the composition; between 0.01% and 2.0% polymer by weight of the composition; and between 0.01% and 1.0% fibers by weight of the composition. The composition having a compressive strength of between 300 psi and 3000 psi after 1 day, a compressive strength of between 900 psi and 4000 psi after 7 days, a compressive strength of between 1200 psi and 5000 psi after 28 days.

In an embodiment of the present disclosure, the aggregate is standard concrete grade sand, for example, sand from Austin Aggregates, 881 Hergotz Ln, Austin, TX 78742, or Vulcan Materials Company, 1200 Urban Center Drive, Birmingham, AL 35242, or Webberville Sand & Gravel, 18601 FM 969, Manor, Texas 78653. The aggregate may, however, be a combination of one or more of the following: sand, fine aggregate (concrete sand), coarse aggregate (rock or gravel), recycled trench spoils, or micro aggregate.

Fine aggregate is known in the industry as concrete sand and is defined by ASTM C33 specifications. Coarse aggregate is known in the industry as rock or gravel and is also defined by ASTM C33 specifications. Recycled trench spoils refers to the material excavated to create a trench, e.g., the gravel, sand, and/or ground asphalt pavement excavated from the ground to create a trench in order to place cables or wires into the trench prior to backfilling the trench with compositions of the present disclosure. Micro aggregate refers ultra-fine, inert or chemically active, particles that are predominantly sized less than a #200 sieve. One example of a micro aggregate is BHF, which are dust-sized micro aggregates that are typically, but not necessarily, captured in bag houses to prevent air pollution, and could be inert minerals, lime, cement kiln dust, or other chemical or mineral materials. Thus, BHF includes micro aggregates recovered via one or more of fabric filters (baghouses), wet scrubbers, electrostatic precipitators (wet or dry), and mechanical collectors (e.g., cyclones).

In an embodiment of the present disclosure, the composition has between about 50% and about 95% aggregate, between about 55% and about 90% aggregate, between about 55% and about 75% aggregate, between about 60% and about 80% aggregate, or between about 60% and 70% aggregate. In certain embodiments, a composition of the present disclosure will have less than about 95% aggregate, less than about 90% aggregate, less than about 85% aggregate, less than about 80% aggregate, less than about 75% aggregate, less than about 70% aggregate, less than about 65% aggregate, or less than about 60% aggregate. In still other embodiments, a composition of the present disclosure will have greater than about 55% aggregate, greater than about 60% aggregate, greater than about 65% aggregate, greater than about 70% aggregate, greater than about 75% aggregate, greater than about 80% aggregate, or greater than about 85% aggregate.

In certain embodiments of the present disclosure, the aggregate will consist entirely of sand, fine aggregate, coarse aggregate, recycled trench spoils, or micro aggregates like BHFs. In other embodiments of the present disclosure, the aggregate may consist of one or more combinations of sand, fine aggregate, coarse aggregate, recycled trench spoils, or BHF in order to reach the desired specification for the composition.

In an embodiment of the present disclosure, the cementitious material is standard Portland cement, which is well known in the industry. The Portland cement of the present disclosure may be Type I, Type II, Type III, Type IV, Type V, or some combination thereof. In an embodiment, the Portland cement is Type I-II. The Portland cement of the present disclosure can be obtained from a variety of sources based on economics, location, chemical properties, or additional criteria. For example, Portland cement can be obtained from CEMEX, 5134 Ute Rd, Longmont, Colorado 80503. In certain embodiments of the present disclosure, the cementitious material may be FasTrac™ Cement (e.g., FastTrac 400) from Western Material and Design, LLC, 1150 SE Hamblin Rd. Lee's Summit, MO. 64063. In certain embodiments of the present disclosure, the cementitious material may be Rapid Set® Cement (e.g., Calcium Sulfoaluminate Cement) from CTS Cement Manufacturing Corp., 11065 Knott Ave, Suite A, Cypress, CA 90630. In some embodiments of the present disclosure the cementitious material is fly ash, e.g., Class C fly ash.

In an embodiment of the present disclosure, a composition has between about 3% and about 35% cement, between about 4% and about 30% cement, between about 8% and about 25% cement, or between about 12% and about 18% cement.

In some embodiments of the present disclosure, a composition has a measurable amount of, but less than about 40% cement, less than about 35% cement, less than about 30% cement, less than about 25% cement, less than about 20% cement, less than about 15% cement, or less than about 10% cement.

In additional embodiments of the present disclosure, the composition has greater than about 3% cement, greater than about 4% cement, greater than about 6% cement, greater than about 10% cement, greater than about 15% cement, greater than about 20% cement, greater than about 25% cement, greater than about 30% cement, or a greater than about 35% cement.

In an embodiment of the presently disclosed composition, the accelerant is calcium chloride ($CaCl_2$)), sodium bicarbonate, NCA, or some combination thereof. In certain embodiments, the accelerant is dry powder or liquid, or some combination thereof. The accelerant may be purchased from well-known commercial sources, e.g., TETRA Chemicals, 24955 Interstate 45 North, The Woodlands, TX 77380 or CHRYSO, Inc., P.O. Box 190, Rockwall, TX 75087.

Some compositions of the present disclosure will include an accelerant. The accelerant of the presently disclosed composition may vary depending on setting time and final compressive strength. In an embodiment of the present disclosure, a composition has between about 0.25% and about 8.0% accelerant by weight of the composition, between about 0.50% and about 6%, between about 0.5% and about 4.0%, between about 0.5% and about 2%, between about 1.0% and about 4.0%, between about 1.0% and about 3.0%.

In additional embodiments, a composition has greater than about 0.1% accelerant by weight of the composition, greater than about 0.2% accelerant, greater than about 0.25% accelerant, greater than about 1.0% accelerant, greater than about 2.0% accelerant, or greater than about 3.0% accelerant. In other embodiments, a composition has less than about 10% accelerant by weight of the composition, less than about 8.0% accelerant, less than about 6.0% accelerant, less than about 4.0% accelerant, less than about 2.0% accelerant, less than about 1.0% accelerant, or less than about 0.5% accelerant.

In an embodiment of the presently disclosed composition, the water is standard city potable water. In another embodiment, the water used in the composition is substantially purified of additional minerals or other impurities. In still another embodiment of the present disclosure, the water is non-potable water. In additional embodiments, the water is selected based on its natural impurities, e.g., specific mineral content like calcium, magnesium, iron, or similar water minerals.

The water content of the presently disclosed composition may vary depending on desired flowability, setting time, and final compressive strength. In an embodiment of the present disclosure, a composition has a the water content of between about 5% and about 40%, between about 8% and about 35%, between about 10% and about 30%, between about 10% and about 20%, between about 12% and about 18%, between about 13% and about 17%.

In additional embodiments, a composition has greater than about 5% water, greater than about 8% water, greater than about 10% water, greater than about 15% water, greater than about 20% water, or greater than about 25% water. In other embodiments, a composition has less than about 40% water, less than about 35% water, less than about 30% water, less than about 25% water, less than about 20% water, less than about 15% water, or less than about 10% water. Any water included with additional ingredients, e.g., aqueous water reducers, foaming agents, etc. under the circumstances encountered in the field by the inventors has been negligible in comparison to the primary batch water and therefore has not been included in the above calculations. Depending on the actual water content of the additional ingredients used it may be necessary to consider the additional water in the final water concentrations.

In some embodiments, the compositions may include a water reducer, e.g., a standard water reducer or a High Range Water Reducer for maintaining fluid properties at lower total water contents. A High Range Water Reducer is available as Sika ViscoCrete 4100 and Sika ViscoCrete 6100, Sika Corporation, 201 Polito Avenue, Lyndhurst, NJ 07071. Another example of a water reducer is Chryso Fluid Premia 198 from Chryso Inc., 10600 Hwy 62, Unit 7, Charlestown, IN 47111.

In some embodiments, the compositions of the present disclosure may further comprise a polymer, e.g., hydroxypropyl methylcellulose, based on the desired properties of the compositions. Notably, the addition of polymer captures air within the composition, which has beneficial properties for reducing freeze thaw heave. The addition of a polymer or multiple polymers helps reduce water in a composition (or traditional water reducers may also be used in conjunction or independent of polymers); helps achieve greater air entrainment of a composition; and helps improve suspension of sand particles (or aggregates) in the mix. All of which result in a more fluid, non-segregating, minimal bleed water mix, while using less water. In an embodiment, the concentration of the polymer is between about 0.01% and about 2.0% by weight of dry solids in the composition, between about 0.05% and about 1.0% by weight of dry solids in the composition, or between about 0.05% and about 0.20% by weight of dry solids in the composition. In certain embodiments, the concentration of the polymer is greater than about 0.01%, is greater than about 0.05%, is greater than about 0.10%, or is greater than about 0.15%. In certain embodiments, the concentration of the polymer is less than about 2.0%, is less than about 1.0%, is less than about 0.5%, or is less than about 0.1%.

In some embodiments, the compositions of the present disclosure may further comprise fibers, e.g., FiberCast polypropylene fibers of either 0.5 inches or 0.25 inches in length. FiberCast fibers are available from Fibermesh®, 4019 Industry Drive, Chattanooga, TN 37416, e.g., Fibercast® 500 Micro-Synthetic Fiber. Fibers may also be purchased from Nippon Electric Glass Co., Ltd, 906 Ima, Notogawa, Kanzaki, Shiga, Japan, e.g., AR 5000 H-530X. In an embodiment, the concentration of the fibers is between about 0.01% and about 1.0% by weight of the composition, between about 0.02% and about 1.0% by weight of the composition, or between about 0.03% and about 0.1% by weight of the composition. In certain embodiments, the concentration of the fibers is greater than about 0.01%, is greater than about 0.02%, is greater than about 0.3%, or is greater than about 0.4%. In certain embodiments, the concentration of the fibers is less than about 0.5%, is less than about 0.1%, is less than about 0.05%, or is less than about 0.04%.

In some embodiments, the compositions of the present disclosure may further comprise a coloring agent, e.g., Charcoal Black (Cemex Rich Color) coloring agent from Cemex, 10100 Katy Freeway, Suite 3000, Houston, Texas, 77043; Davis Colors, 3700 East Olympic Blvd, Los Angeles, CA 90025; Solomon Colors, 4050 Color Plant Road, Springfield, IL 62702.

In an embodiment, the concentration of the coloring agent is between about 0.01% and about 5.0% by weight of the composition, between about 0.1% and about 2.0% by weight of the composition, or between about 0.2% and about 1.0% by weight of the composition. In certain embodiments, the concentration of the fibers is greater than about 0.01%, is greater than about 0.1%, is greater than about 0.2%, is greater than about 0.5%, is greater than about 1.0%, is greater than about 2.0%, or is greater than about 3.0%. In certain embodiments, the concentration of the coloring agent is less than about 5.0%, is less than about 4.0%, is less than about 3.0%, is less than about 2.0%, is less than about 1.0%, is less than about 0.5%, is less than about 0.4%, is less than about 0.3%, or is less than about 0.1%.

In some embodiments, the compositions of the present disclosure may further comprise a water-proofing agent, e.g., Xpex Admix C-500-NF & C-1000NF®, which is available from Xypex Chemical Corporation, 13731 Mayfield Place, Richmond BC, Canada, V6V 2G9. In an embodiment, the compositions of the present disclosure may further comprise a water-repelling agent, e.g., Chryso PoreTite 77 & Chryso PoreTite 110, which is available from Chryso Inc., 10600 Hwy 62, Unit 7, Charlestown, IN 47111 and MasterPel 240, which is available from Master Builders-BASF, 23700 Chagrin Boulevard, Cleveland, OH 44122. In an embodiment, the water-proofing agent will reduce or eliminate efflorescence based on a visible inspection and comparison of samples with and without water-proofing admixture. For example, in an embodiment, the use of a water-proofing or water-repelling agent stopped efflorescence within 2-3 days versus control compositions that required roughly a week of rain. In an embodiment, the concentration of the water-proofing agent is between about 0.01-1.0% by weight of the composition. For example, Xypex, dry powder: 1%-3% by weight of cement or about 0.16%-0.92% by weight of composition for cement contents between 600 and 1200 #/CY; Chryso PoreTitel 10 or 77, liquid admixture: 3-36 fl.oz./cwt or about 0.03%-0.72% by weight for cement contents between 600 and 1200 #/CY; or MasterPel240, liquid admixture: 1-5 fl.oz/cwt or about 0.01%-0.10% by weight for cement contents between 600 and 1200 #/CY.

Compositions of the present disclosure will have a range of compressive strengths at various times after the addition of a composition to a trench depending on the desired properties of the composition. For example, and similar to faster set times, a higher earlier compressive strength is advantageous when working when backfilling trenches in a roadway or other highly traveled area. The higher, earlier compressive strength allows for the backfilled void to be reopened for use at an earlier time. In certain embodiments, the compressive strength is measured at 1 hour, 2 hours, 4 hours, 8 hours, 1 day, 7 days, and 28 days where the 28 day measurement is considered the final compressive strength.

In other embodiments, the compressive strength is measured more often at smaller intervals. In some embodiments, the compressive strength is measured at 90 days. In an embodiment, the bearing capacity or penetration resistance of a composition is measured at 1 hour, 2 hours, 4 hours, 8 hours, 1, day, 7 days, and 28 days after backfilling using ASTM WK 27337 or C403.

In an embodiment, the compressive strength of a composition of the present disclosure at 4 hours as measured by ASTM D4832 will have no measurable psi. In certain embodiments it will be between about 20 psi and about 1500 psi, between about 100 psi and about 1200 psi, between about 200 psi and about 1100 psi, between 300 psi and 1000 psi, or between 400 psi and 900 psi. In additional embodiments, the compressive strength of the composition at 4 hours will be greater than about 50 psi, will be greater than about 100 psi, will be greater than about 200 psi, will be greater than about 300 psi, will be greater than about 400 psi, or will be greater than 500 psi. In certain embodiments, the compressive strength of the composition at 4 hours will be less than about 1500 psi, will be less than about 1200 psi, will be less than about 1100 psi, will be less than about 1000 psi, will be less than about 900 psi, will be less than about 800 psi, or will be less than about 700 psi.

In an embodiment, the compressive strength of a composition of the present disclosure at 1 day will be between about 10 psi and about 4000 psi, between about 100 psi and about 3500 psi, between about 200 psi and about 3000 psi, between about 400 psi and about 3000 psi, or between about 1500 psi and about 3000 psi. In additional embodiments, the compressive strength of the composition at 1 day will be greater than about 10 psi, will be greater than about 50 psi, will be greater than about 100 psi, will be greater than about 200 psi, will be greater than 250 psi, will be greater than 400 psi, will be greater than 700 psi, will be greater than 1000 psi, will be greater than about 1500 psi, will be greater than about 2000 psi, will be greater than about 2200 psi, will be greater than about 2500 psi, or will be greater than about 2500 psi. In certain embodiments, the compressive strength of the composition at 1 day will be less than about 4000 psi, will be less than about 3000 psi, will be less than about 2500 psi, will be less than about 2000 psi, will be less than about 1500 psi, will be less than about 1000 psi, or will be less than about 500 psi.

In an embodiment, the compressive strength of a composition of the present disclosure at 7 days will be between about 300 psi and about 4000 psi, between about 500 psi and about 4000 psi, between about 700 psi and about 4000 psi, between about 1000 psi and about 3500 psi, between about 1500 psi about 3500 psi, between about 2000 psi and about 3500 psi, between about 2500 and about 3500 psi, or between about 3000 psi and 4000 psi. In additional embodiments, the compressive strength of the composition at 7 days will be greater than about 200 psi, will be greater than about 400 psi, will be greater than about 700 psi, will be greater than about 900 psi, will be greater than 1100 psi, will be greater than 1500 psi, will be greater than about 2000 psi, will be greater than about 2500, will be greater than about 3000 psi, will be greater than about 3500 psi, or will be greater than about 4000 psi. In certain embodiments, the compressive strength of the composition at 7 days will be less than about 5000 psi, will be less than about 4000 psi, will be less than about 3500 psi, will be less than about 3000 psi, will be less than about 2500 psi, will be less than about 2000 psi, or will be less than about 1500 psi.

In an embodiment, the compressive strength of a composition of the present disclosure at 28 days will be between about 1000 psi and about 5000 psi, between about 1200 psi and about 45000 psi, between about 1800 psi and about 4500 psi between about 2000 psi and about 4000 psi, between about 2500 and about 4000 psi, between about 3000 psi and about 4000 psi, between about 2000 and about 3000 psi, or between about 1000 and about 2000 psi. In additional embodiments, the compressive strength of the composition at 28 days will be greater than about 500 psi, will be greater than about 1000 psi, will be greater than about 1500 psi, will be greater than about 2000 psi, will be greater than about 2500 psi, will be greater than about 3000 psi, will be greater than about 3500 psi, will be greater than about 4000 psi, will be greater than about 4500 psi, or will be greater than about 5000 psi. In certain embodiments, the compressive strength of the composition at 28 days will be less than about 5500 psi, less than about 5000 psi, less than about 45000 psi, less than about 4000 psi, less than about 3500 psi, less than about 3000 psi, less than about 2500 psi, less than about 2000 psi, or less than about 1500 psi.

In certain embodiments of the present disclosure, a composition does not include one or more of the following: does not include a water reducer, does not include fly ash, does not include a set retarder, does not include polymer, does not include sand, does not include BHF, does not include fine aggregate, does not include coarse aggregate, or does not include recycled spoils.

Some compositions of the present disclosure will include the addition of foam, e.g., the amount of air content within a composition can be controlled by varying cellular foam, which can be optimized for the ultimate strength gain desired, the ambient temperature during the backfilling process, and the desired final properties. In specific embodiments, the air content may be achieved by adding a pre-formed cellular foam, e.g., Aerlite-ix foam liquid concentrate available from Aerix Industries, 7020 Snowdrift Road, Suite 102, Allentown, PA 18106 or 5916 McIntyre St, Golden, CO 80403. The cellular foam may be pervious or non-pervious, and pre-foamed thereby reducing or alleviating the need to vigorously agitate the composition to activate the air entraining agent. Any suitable foaming agent may be used that achieves the desired end properties as described herein, e.g., an anionic foaming agent, a cationic foaming agent or a non-ionic foaming agent. An example of a pervious foam is AQUAERiX. Examples of a non-pervious foam are Aerlite or Aerlite-ix. When water penetration is not desired, a non-pervious cellular foam is normally used. Suitable cellular foam is available from a variety of sources, e.g., Aerix industries; Provoton Foam Concrete, 28 East Larkspur Lane, Bristol, IL 60512; Allied Foam Tech Corp., 146 Keystone Dr. Montgomeryville, PA 18936; and Vermillion LLC and Associates, 2176 Sargent Daly Dr., Chattanooga, TN 37421. The choice of an appropriate cellular foam is within one of skill in the art and may be dictated by cost, environmental concerns, or the need to meet the requirements of local or national agencies. In some embodiments, the foaming agent will conform to ASTM C869 and C796, in other embodiments the air entraining agent conforms to ASTM C260.

Beneficial air content in these accelerated mixtures can also be obtained with conventional air entraining admixtures (AEA) for Portland cement concrete, and generated through the mixing process. The amount of air entraining agent necessary for a given composition will vary with the desired air content, e.g., the desired final compressive strength. In some embodiments, the final air content of the composition will be between about 1% to about 20%, about 2% to about 15%, about 5% to about 15%. In some embodiments, the final air content will be less than about 40%, less than about 35%, less than about 30%, less than about 25%, less than about 20%, less than about 15%, less than about 12%. In some embodiments, the final air content will be greater than about 1%, greater than about 5%, greater than about 8%, greater than about 10%, or greater than about 12%.

The present disclosure also provides for a method of backfilling a trench with a disclosed composition. In one embodiment, a method of backfilling a trench with a composition comprising recycled trench spoils. For example, a method includes excavating a trench or void, maintaining some portion of the excavated trench spoils for addition to a composition, mixing a composition of the present disclosure that includes some portion of the excavated trench spoils, and filing the trench or void with the composition that includes the recycles trench spoils.

EXAMPLES

Example 1

Fourteen embodiments of the compositions described above were prepared for testing and evaluation. The components for each of the fourteen compositions is set forth below based on pounds per cubic yard (lb/cy) and percent (%) of the composition by weight. The cement in each composition is Portland cement from CEMEX. The water for each composition is standard tap water. The sand for each composition is from Austin Aggregates. The polymer for each composition, if any, is hydroxypropyl methylcellulose. The coloring agent for each composition is Charcoal Black from Cemex. The fibers for each composition, if any, are polypropylene fibers (FiberCast) from Fibermesh. The air entraining agent (AEA), if any, is Chryso Air 260. The viscosity enhancing agent (VMA), if any, is Chryso Optifnish A758. Mix ID's and descriptions of the components are consistent throughout the Examples 1-7 unless otherwise noted.

TABLE 1

Components of Fourteen Embodiments of the Compositions.

| Mix ID | Composition (lb/CY) | | | | | | AEA (oz./CY) | VMA (oz./CY) | Composition (%) | | | | | |
|---|---|---|---|---|---|---|---|---|---|---|---|---|---|---|
| | Cement | Sand | Color | Polymer | Water | Fibers | | | Cement | Sand | Color | Polymer | Water | Fibers |
| NGN-450 | 450 | 2620 | 10 | 0 | 534 | 1.5 | 0 | 0 | 12.45 | 72.47 | 0.28 | 0.00 | 14.77 | 0.04 |
| NGN-500 | 500 | 2575 | 10 | 0 | 534 | 1.5 | 0 | 0 | 13.81 | 71.12 | 0.28 | 0.00 | 14.75 | 0.04 |
| NGN-550 | 550 | 2550 | 10 | 0 | 526 | 1.5 | 0 | 0 | 15.12 | 70.10 | 0.27 | 0.00 | 14.46 | 0.04 |
| NGN-600 | 600 | 2525 | 10 | 0 | 526 | 1.5 | 0 | 0 | 16.38 | 68.94 | 0.27 | 0.00 | 14.36 | 0.04 |
| NGN-500-P | 500 | 2480 | 10 | 3 | 567 | 1.5 | 0 | 0 | 14.04 | 69.63 | 0.28 | 0.08 | 15.92 | 0.04 |
| NGN-550-P | 550 | 2450 | 10 | 3 | 563 | 1.5 | 0 | 0 | 15.37 | 68.48 | 0.28 | 0.08 | 15.74 | 0.04 |
| NGN-600-P | 600 | 2430 | 10 | 3 | 555 | 1.5 | 0 | 0 | 16.67 | 67.51 | 0.28 | 0.08 | 15.42 | 0.04 |
| GNP-600 | 600 | 2430 | 10 | 3 | 551 | 2.5 | 0 | 0 | 16.68 | 67.57 | 0.28 | 0.08 | 15.32 | 0.07 |
| GNP-600.25 | 600 | 2430 | 10 | 3 | 551 | 2.5 | 0 | 0 | 16.68 | 67.57 | 0.28 | 0.08 | 15.32 | 0.07 |
| GNP-600.50 | 600 | 2430 | 10 | 3 | 551 | 2.5 | 0 | 0 | 16.68 | 67.57 | 0.28 | 0.08 | 15.32 | 0.07 |
| HSF-600-PC | 600 | 2600 | 10 | 83 | 450 | 0 | 0 | 0 | 16.03 | 69.46 | 0.27 | 1.22 | 13.02 | 0.00 |
| GNP-600-S | 600 | 2430 | 10 | 83 | 474 | 2.5 | 0 | 0 | 16.67 | 67.51 | 0.28 | 1.27 | 14.21 | 0.07 |
| G-600-A | 600 | 2430 | 10 | 0 | 555 | 2.5 | 8.8 | 0 | 16.68 | 67.55 | 0.28 | 0.00 | 15.43 | 0.07 |
| G-600-AV | 600 | 2430 | 10 | 0 | 555 | 2.5 | 10.6 | 5 | 16.68 | 67.55 | 0.28 | 0.00 | 15.43 | 0.07 |

Example 2

Some of the above compositions were evaluated for compressive strength using ASTM D4832 (psi) at 1 day, 7 days, and 28 days as disclosed in Table 2. In addition, the water to cement ratio (W/C), unit weight (UW (pcf)) using ASTM C138, and spread (inches) using ASTM D6103 were also measured. Importantly, the addition of polymer to a composition increased the air content and decreased the compressive strength at all three measured time increments, e.g., compare MIX ID NGN-500 to MIX ID NGN 500-P, MIX ID NGN-500 to MIX ID NGN-500-P, and MIX ID NGN-600 to MIX ID NGN-600-P.

TABLE 2

Compositions with and without Polymers and Varying Cementitious content.

| Mix ID | Composition (lb/CY) | | | | | | UW (pcf) | Air (%) | W/C | Spread (in) | Compressive (psi) | | |
|---|---|---|---|---|---|---|---|---|---|---|---|---|---|
| | Cement | Sand | Water | Fibers | Color | Polymer | | | | | 1-day | 7-day | 28-day |
| NGN-450 | 450 | 2620 | 534 | 1.5 | 10 | 0 | 129.6 | 3.2 | 1.19 | 9 | 185 | 845 | 1184 |
| NGN-500 | 500 | 2575 | 534 | 1.5 | 10 | 0 | 130.6 | 2.5 | 1.07 | 9 | 227 | 1130 | 1490 |
| NGN-550 | 550 | 2550 | 526 | 1.5 | 10 | 0 | 131.6 | 2.4 | 0.96 | 9 | 355 | 1550 | 2080 |
| NGN-600 | 600 | 2525 | 526 | 1.5 | 10 | 0 | 131.6 | 2.8 | 0.88 | 9 | 470 | 1850 | 2525 |
| NGN-500-P | 500 | 2480 | 567 | 1.5 | 10 | 3.0 | 114.3 | 14 | 1.13 | 11 | 100 | 450 | 646 |
| NGN-550-P | 550 | 2450 | 563 | 1.5 | 10 | 3.0 | 118.1 | 11.3 | 1.02 | 11 | 200 | 860 | 956 |
| NGN-600-P | 600 | 2430 | 555 | 1.5 | 10 | 3.0 | 118.7 | 11.5 | 0.92 | 10.5 | 300 | 1021 | 1151 |

Example 3

Some of the above compositions were evaluated for compressive strength using ASTM D4832 (psi) at 1 day, 7 days, and 28 days as disclosed in Table 3. The viscosity agent (VMA), if any, is Chryso Optifinish A758 from CHRYSO Inc., 1611 State Hwy 276, Rockwall, TX 75032. Notably, similar characteristics are achieved using either viscosity modifying agent or polymer.

TABLE 3

Compositions with Viscosity Modifying Agent or Polymer

| Mix ID | Composition (lb./CY) | | | | | | VMA oz./cwt | AEA oz./CV | UW (pcf) | Air (%) | W/C | Spread (in) | Compressive (psi) | | |
|---|---|---|---|---|---|---|---|---|---|---|---|---|---|---|---|
| | Cement | Sand | Water | Fibers | Color | Polymers | | | | | | | 1-day | 7-day | 28-day |
| G-600-A | 600 | 2430 | 555 | 2.5 | 10 | 0 | 0.0 | 8.8 | 121.0 | 10.5 | 0.92 | 10 | 374 | 1248 | 1622 |
| G-600-AV | 600 | 2430 | 555 | 2.5 | 10 | 0 | 5.0 | 10.6 | 120.9 | 11.0 | 0.92 | 10 | 365 | 1186 | 1542 |
| NGN-600-P | 600 | 2430 | 555 | 2.5 | 10 | 3 | 0.0 | 0.0 | 118.7 | 11.5 | 0.92 | 10.5 | 300 | 1021 | 1151 |
| NGN-600 | 600 | 2525 | 526 | 1.5 | 10 | 0 | 0.0 | 0.0 | 131.6 | 2.8 | 0.88 | 9 | 470 | 1850 | 2525 |

Example 4

Some of the above compositions were evaluated for compressive strength using ASTM D4832 (psi) at 1 day, 7 days, and 28 days as disclosed in Table 4. Notably, the addition of fibers (0.25 inch or 0.5 inch) did not affect compression strength measurements at any time interval measured. The polymer in MIX ID HSF-600-PC was Surecrete Polymer concentrate at 10 gal/CY.

TABLE 4

Evaluation Of Fibers on Compressive Strength.

| Mix ID | Composition (lb/CY) | | | | | | W/C | UW (pcf) | Air (%) | Spread (in) | Fiber Size (in) | compressive Strength (psi) | | |
|---|---|---|---|---|---|---|---|---|---|---|---|---|---|---|
| | Cement | Sand | Water | Color | Fibers | Polymers | | | | | | 1-day | 7-day | 28-day |
| GNP-600 | 600 | 2430 | 551 | 10 | 0 | 3 | 0.92 | 122.4 | 9 | 10 | — | 240 | 1000 | 1480 |
| GNP-600.25 | 600 | 2430 | 551 | 10 | 2.5 | 3 | 0.92 | 119.1 | 12 | 10.5 | 0.25 | 305 | 1015 | 1320 |
| GNP-600.50 | 600 | 2430 | 551 | 10 | 2.5 | 3 | 0.92 | 119.4 | 12 | 10.5 | 0.50 | 285 | 1015 | 1360 |
| HSF-600-PC | 600 | 2600 | 450 | 10 | 0 | 83 | 0.81 | 129.6 | 7.3 | 9 | — | — | 1590 | 2180 |

Example 5

Some of the above compositions were evaluated for bond strength to determine the ability of a MIX ID to stay in a backfilled trench by bonding to one or both sides of the trench, e.g., increased bond strength equates to increased service life of the backfill. The relative bond of the MIX ID was tested as follows: 4" asphalt cores were moistened, lightly coated with fine rock dust, and allowed to air dry, to simulate dirty trench wall conditions that may impede bonding during use. The various MIX ID compositions were poured around the cores, surrounded by a shortened 6" plastic concrete cylinder mold, and allowed to cure for 28 days. The bottom of the mixture was supported by a wooden block with a 4.5" hold cut into it, to allow the asphalt core to be pressed downward in a testing machine, which allows the determinant of bonding strength. The bond strengths in Table 5 were calculated as the downward load in pounds divided by the circumferential area of contact in square inches, resulting in psi. Notably, the highest bond strength was achieved by both samples of MIX ID GNP-600, which included fibers but no polymers.

TABLE 5

Bond Strength Testing

| Mix ID | Sample No. | Max Load (lb) | Height (in) | Diameter (in) | Area (sq. in) | Bond Strength (psi) | Avg. Bond, B (psi) | Compressive Strength, C (psi) | B/C (%) |
|---|---|---|---|---|---|---|---|---|---|
| GNP-600 | 1 | 4620 | 2.875 | 3.875 | 35.00 | 132 | 151 | 1480 | 10.2 |
| GNP-600 | 2 | 5960 | 2.875 | 3.875 | 35.00 | 170 | | | |
| GNP-600.50 | 1 | 3005 | 2.875 | 3.875 | 35.00 | 86 | 107 | 1360 | 7.8 |
| GNP-600.50 | 2 | 4465 | 2.875 | 3.875 | 35.00 | 128 | | | |
| GNP-600-S | 1 | 4425 | 2.875 | 3.875 | 35.00 | 126 | 116 | 2180 | 5.3 |
| GNP-600-S | 2 | 3685 | 2.875 | 3.875 | 35.00 | 105 | | | |

Example 6

Two lengths of fibers (0.25 inch and 0.5 inch) were tested against a baseline composition without fibers (MIX ID GNP-600). The compositions were tested for flexural strength with a "third-point" loading apparatus (ASTM C78), which is similar to testing for the flexural strength of paving concrete but scaled down to test 4" by 4" by 12" long beam molds for the sand-based mixtures.

TABLE 6

Fiber Evaluation through Flexural Testing.

| Mix ID | Sample No. | Max Load (lb) | Span, L (in) | Width, b (in) | Depth, d (in) | Air Content (%) | Modulus of Rupture, R (psi) | Avg. R. (psi) | Compressive Strength, C (psi) | $\frac{R}{\sqrt{C}}$ |
|---|---|---|---|---|---|---|---|---|---|---|
| GNP-600    | 1 | 2370 | 10.5 | 4 | 4 | 9  | 389 | 409 | 1480 | 10.5 |
| GNP-600    | 2 | 2615 | 10.5 | 4 | 4 | 9  | 429 |     |      |      |
| GNP-600.25 | 1 | 2060 | 10.5 | 4 | 4 | 12 | 338 | 347 | 1320 | 9.6  |
| GNP-600.25 | 2 | 2170 | 10.5 | 4 | 4 | 12 | 356 |     |      |      |
| GNP-600.50 | 1 | 2260 | 10.5 | 4 | 4 | 12 | 371 | 358 | 1360 | 9.7  |
| GNP-600.50 | 2 | 2120 | 10.5 | 4 | 4 | 12 | 348 |     |      |      |

Example 7

A comparison of the some of the above compositions and data is presented in Table 7. Notably, fibers in the compositions resulted in an improvement in composition tenacity to withstand forces of expansion and contraction. The fibers also helped generate more air during the mixing process, which is beneficial for improving freeze-thaw durability. In addition, fibers in the compositions demonstrated an ability to increase impact resistance and durability of the trench fill in service.

TABLE 7

Comparison of Four Above-Discussed Compositions.

| Mix ID | NGN-600 | GNP-600.50 | HSF-600-PC | G-600-A |
|---|---|---|---|---|
| Cement, Type I/II (Cemex), lb/CY | 600 | 600 | 600 | 600 |
| Concrete Sand (RMC Aggregates), lb/CY | 2525 | 2430 | 2600 | 2430 |
| Water, lb/CY | 526 | 551 | 450 | 555 |
| Fibermesh FiberCast 500% fibers, lb/CY | 1.5 | 2.5 | 0 | 2.5 |
| BPI H400 HPMC polymers, lb/CY | — | 3 | — | — |
| Polymer (Surecrete), gallons/CY | — | — | 10 | — |
| AEA, Chryso Air 260, oz/CY | — | — | — | 8.8 |
| Color Pigment, lb/CY | 10 | 10 | 10 | 10 |
| Fluidity, (D6103 spread in inches) | 9 | 10.5 | 9 | 10 |
| Air Content, % | 2.8 | 12 | 7.3 | 10.5 |
| Unit Weight pcf | 131.6 | 119.4 | 129.6 | 121.0 |
| w/c ratio | 0.88 | 0.92 | 0.81 | 0.92 |
| Compressive Strength, psi at 1 day | 470 | 285 | — | 374 |
| Compressive Strength, psi at 7 days | 1850 | 1015 | 1590 | 1248 |
| Compressive Strength, psi at 28 days | 2525 | 1360 | 2180 | 1622* |

Example 8

Eight embodiments of the compositions described above were prepared for testing and evaluation. The components for each of the Eight compositions is set forth below based on pounds per cubic yard (lb/cy) (Table 8A) and percent (%) (Table 8B) of the composition by weight. The cement in each composition is either Portland cement from CEMEX, Rapid Set cement as detailed above in the specification, or FasTrac cement as detailed above in the specification. The water for each composition is standard tap water. The sand for each composition is from Austin Aggregates. The polymer for each composition, if any, is hydroxypropyl methylcellulose (HPMC). The coloring agent for each composition is Charcoal Black from Cemex. The fibers for each composition are polypropylene fibers from FiberCast. An accelerant, if any, is calcium chloride (CaCl). Mix ID's and descriptions of the components are consistent throughout the remaining Examples 8-9 unless otherwise noted.

TABLE 8A

Additional Compositions of the Present Disclosure in lb/cy.

| | Composition, (lb/CY) | | | | | | | |
|---|---|---|---|---|---|---|---|---|
| Mix ID | Cement | Rapid Set | FasTrac | Sand | Color | HPMC | Fibers | Water | CaCl |
| FT-400 | 0 | 0 | 400 | 2625 | 20 | 2 | 2.5 | 542 | 0 |
| FT-658 | 0 | 0 | 658 | 2500 | 20 | 2 | 2.5 | 517 | 0 |
| RS-300 | 0 | 300 | 0 | 2740 | 20 | 2 | 2.5 | 540 | 0 |
| RS-400 | 0 | 400 | 0 | 2600 | 20 | 2 | 2.5 | 542 | 0 |
| RS-500 | 0 | 500 | 0 | 2525 | 20 | 2 | 2.5 | 534 | 0 |
| RS-600 | 0 | 600 | 0 | 2450 | 20 | 2 | 2.5 | 526 | 0 |
| 600-FP-CC | 600 | 0 | 0 | 2475 | 20 | 2 | 2.5 | 542 | 60 |
| 600-CC-2 | 600 | 0 | 0 | 2475 | 20 | 2 | 2.5 | 542 | 30 |

TABLE 8b

Compositions of Table 8A in Percentage by Weight of Composition.

| | Composition, (% by Weight) | | | | | | | |
|---|---|---|---|---|---|---|---|---|
| Mix ID | Cement | Rapid Set | FasTrac | Sand | Color | HPMC | Fibers | Water | CaCl |
| FT-400 | 0 | 0 | 11.14 | 73.09 | 0.56 | 0.06 | 0.07 | 15.09 | 0 |
| FT-658 | 0 | 0 | 17.79 | 67.58 | 0.54 | 0.05 | 0.07 | 13.97 | 0 |
| RS-300 | 0 | 8.32 | 0 | 76.02 | 0.55 | 0.06 | 0.07 | 14.98 | 0 |
| RS-400 | 0 | 11.22 | 0 | 72.90 | 0.56 | 0.06 | 0.07 | 15.20 | 0 |
| RS-500 | 0 | 13.95 | 0 | 70.46 | 0.56 | 0.06 | 0.07 | 14.90 | 0 |
| RS-600 | 0 | 16.66 | 0 | 68.05 | 0.56 | 0.06 | 0.07 | 14.61 | 0 |
| 600-FP-CC | 16.21 | 0 | 0 | 66.86 | 0.54 | 0.05 | 0.07 | 14.64 | 1.62 |
| 600-CC-2 | 16.34 | 0 | 0 | 67.41 | 0.54 | 0.05 | 0.07 | 14.76 | 0.82 |

Example 9

The compositions from Example 8 were evaluated for compressive strength using ASTM D4832 (psi) at 2 hours, 4 hours, 1 day, 7 days, and 28 days as disclosed in Table 9. In addition, the water to cement ratio (W/C), unit weight (UW (pcf)) using a ASTM C138, and spread (inches) using a ASTM D6103 were also measured. Notably, compositions using Rapid Set or FasTrac cement set quicker than compositions with Portland cement and a calcium chloride accelerant.

TABLE 9

Compressive Strength Testing of Example 8 Compositions

| | | | | Spread | Compressive Strength (psi) | | | | |
|---|---|---|---|---|---|---|---|---|---|
| Mix ID | W/CM | UW (pcf) | Air (%) est | (in) | 2 hour | 4 hour | 1 day | 7 day | 28 day |
| FT-400 | 1.36 | 118.9 | 11.5 | 9 | 372 | 498 | 771 | 915 | |
| FT-658 | 0.79 | 120.3 | 13 | 9 | 212 | 622 | 1078 | 1474 | 1759 |
| RS-300 | 1.80 | 117.2 | 12.5 | 8 | 82 | 143 | 257 | 310 | |
| RS-400 | 1.36 | 121.8 | 9 | 9 | 208 | 363 | 553 | 578 | |
| RS-500 | 1.07 | 119.9 | 10.8 | 9 | 596 | 767 | 1111 | 1242 | |
| RS-600 | 0.88 | 122.3 | 9.4 | 9 | 915 | 1187 | 1627 | 1764 | |
| 600-FP-CC | 0.90 | 122.6 | 9 | 9 | 7 | 50 | 172 | 632 | 1013 |
| 600-CC-2 | 0.90 | 122 | 10.1 | 9.5 | 9 | 32 | 394 | 960 | |

Example 10

Twenty-nine embodiments of the compositions described above were prepared for testing and evaluation. The components for each of the twenty-nine compositions is set forth below based on pounds per cubic yard (lb/cy) (Table 10A) and percent (%) (Table 10B) of the composition by weight. The cement in each composition is Portland cement from CEMEX (Cement). The water for each composition is standard tap water (Water). The sand for each composition is from Austin Aggregates (Sand). The polymer for each composition, if any, is hydroxypropyl methylcellulose (HPMC). The coloring agent for each composition is Charcoal Black from Cemex (Color). The fibers for each composition are polypropylene fibers from FiberCast (fibers). An accelerant, if any, is calcium chloride (CaCl), sodium bicarbonate (SBC), non-chloride accelerator (NCA). The High Range Water Reducer (HRWR) if any, is Sika ViscoCrete 6100. The air entraining agent, if any, is Chryso's Air260 from CHRYSO Inc., 1611 State Hwy 276, Rockwall, TX 75032. The Mix ID's and descriptions of the components are consistent throughout the remaining Examples 10-11 unless otherwise noted.

TABLE 10a

Additional Compositions of the Present Disclosure in lb/cy.

| Mix ID | Cement | Sand | Color | HPMC | Fibers | Water | SBC | CaCl | CaCl (fl.oz./CY) | NCA (fl.oz./CY) | HRWR (fl.oz/CY) | AEA (fl.oz/CY) |
|---|---|---|---|---|---|---|---|---|---|---|---|---|
| G-650 | 650 | 2500 | 20 | 2 | 2.5 | 509 | 0 | 0 | 0 | 0 | 0 | 0 |
| G-700 | 700 | 2475 | 20 | 2 | 2.5 | 509 | 0 | 0 | 0 | 0 | 0 | 0 |
| G-750 | 750 | 2450 | 20 | 2 | 2.5 | 509 | 0 | 0 | 0 | 0 | 0 | 0 |
| G-800 | 800 | 2400 | 20 | 2 | 2.5 | 501 | 0 | 0 | 0 | 0 | 0 | 0 |
| G-600-CC-2 | 600 | 2475 | 20 | 2 | 2.5 | 542 | 0 | 30 | 978 | 0 | 0 | 0 |
| G-650-CC | 650 | 2500 | 20 | 2 | 2.5 | 509 | 0 | 32.5 | 978 | 0 | 0 | 0 |
| G-700-CC | 700 | 2475 | 20 | 2 | 2.5 | 509 | 0 | 35 | 1060 | 0 | 0 | 0 |
| G-750-CC | 750 | 2450 | 20 | 2 | 2.5 | 509 | 0 | 37.5 | 1141 | 0 | 0 | 0 |
| G-800-CC | 800 | 2400 | 20 | 2 | 2.5 | 501 | 0 | 40 | 1223 | 0 | 0 | 0 |
| GA-700-198 | 700 | 2600 | 20 | 2 | 2.5 | 460 | 0 | 35 | 1141 | 0 | 56 | 0 |
| GA-700-256 | 700 | 2600 | 20 | 2 | 2.5 | 460 | 0 | 35 | 1141 | 0 | 56 | 0 |
| GA-700-WR | 700 | 2525 | 20 | 2 | 2.5 | 490 | 0 | 35 | 1141 | 0 | 56 | 0 |
| GA-700-1.0 | 700 | 2525 | 20 | 1 | 2.5 | 490 | 0 | 35 | 1141 | 0 | 56 | 0 |
| GA-700-1.5 | 700 | 2525 | 20 | 1.5 | 2.5 | 490 | 0 | 35 | 1141 | 0 | 56 | 0 |
| GA-700-3 | 700 | 2525 | 20 | 2 | 2.5 | 490 | 0 | 11.7 | 1141 | 0 | 56 | 0 |
| GA-700-6 | 700 | 2525 | 20 | 2 | 2.5 | 490 | 0 | 23.5 | 1141 | 0 | 56 | 0 |
| G-712-160 | 700 | 2642 | 40 | 2 | 2.5 | 359 | 0 | 0 | 0 | 1120 | 84 | 0 |
| G-808-80 | 800 | 2505 | 40 | 2 | 2.5 | 409 | 0 | 0 | 0 | 640 | 64 | 0 |
| G-908-80 | 900 | 2430 | 40 | 2 | 2.5 | 401 | 0 | 0 | 0 | 720 | 72 | 0 |
| G-1008-80 | 1000 | 2368 | 40 | 2 | 2.5 | 384 | 0 | 0 | 0 | 800 | 80 | 0 |
| G-812-100 | 800 | 2540 | 40 | 2 | 2.5 | 384 | 0 | 0 | 0 | 800 | 96 | 0 |
| G-912-100 | 900 | 2450 | 40 | 2 | 2.5 | 377 | 0 | 0 | 0 | 900 | 108 | 0 |
| G-1012-100 | 1000 | 2346 | 40 | 2 | 2.5 | 375 | 0 | 0 | 0 | 1000 | 120 | 0 |
| GS-700-10 | 700 | 2449 | 40 | 3 | 2.5 | 467 | 70 | 0 | 0 | 0 | 0 | 6 |
| GS-800-10 | 800 | 2292 | 40 | 3 | 2.5 | 492 | 80 | 0 | 0 | 0 | 0 | 6 |

TABLE 10b

Compositions of Table 10A in Percentage by Weight of Composition

| Mix ID | Cement | Sand | Color | HPMC | Fibers | Water | SBC | CaCl | NCA | HRWR | AEA |
|---|---|---|---|---|---|---|---|---|---|---|---|
| G-650 | 17.6 | 67.9 | 0.54 | 0.05 | 0.07 | 13.8 | 0.0 | 0.0 | 0.00 | 0.00 | 0.00 |
| G-700 | 18.9 | 66.7 | 0.54 | 0.05 | 0.07 | 13.7 | 0.0 | 0.0 | 0.00 | 0.00 | 0.00 |
| G-750 | 20.1 | 65.6 | 0.54 | 0.05 | 0.07 | 13.6 | 0.0 | 0.0 | 0.00 | 0.00 | 0.00 |
| G-800 | 21.5 | 64.4 | 0.54 | 0.05 | 0.07 | 13.4 | 0.0 | 0.0 | 0.00 | 0.00 | 0.00 |
| G-600-CC-2 | 16.3 | 67.4 | 0.54 | 0.05 | 0.07 | 14.8 | 0.0 | 0.8 | 0.00 | 0.00 | 0.00 |
| G-650-CC | 17.5 | 67.3 | 0.54 | 0.05 | 0.07 | 13.7 | 0.0 | 0.9 | 0.00 | 0.00 | 0.00 |
| G-700-CC | 18.7 | 66.1 | 0.53 | 0.05 | 0.07 | 13.6 | 0.0 | 0.9 | 0.00 | 0.00 | 0.00 |
| G-750-CC | 19.9 | 65.0 | 0.53 | 0.05 | 0.07 | 13.5 | 0.0 | 1.0 | 0.00 | 0.00 | 0.00 |
| G-800-CC | 21.2 | 63.7 | 0.53 | 0.05 | 0.07 | 13.3 | 0.0 | 1.1 | 0.00 | 0.00 | 0.00 |
| GA-700-198 | 18.3 | 68.0 | 0.52 | 0.05 | 0.07 | 12.0 | 0.0 | 0.9 | 0.00 | 0.10 | 0.00 |
| GA-700-256 | 18.3 | 68.0 | 0.52 | 0.05 | 0.07 | 12.0 | 0.0 | 0.9 | 0.00 | 0.10 | 0.00 |
| GA-700-WR | 18.5 | 66.8 | 0.53 | 0.05 | 0.07 | 13.0 | 0.0 | 0.9 | 0.00 | 0.10 | 0.00 |
| GA-700-1.0 | 18.5 | 66.8 | 0.53 | 0.03 | 0.07 | 13.0 | 0.0 | 0.9 | 0.00 | 0.10 | 0.00 |
| GA-700-1.5 | 18.5 | 66.8 | 0.53 | 0.04 | 0.07 | 13.0 | 0.0 | 0.9 | 0.00 | 0.10 | 0.00 |
| GA-700-3 | 18.6 | 67.2 | 0.53 | 0.05 | 0.07 | 13.0 | 0.0 | 0.3 | 0.00 | 0.10 | 0.00 |
| GA-700-6 | 18.6 | 67.0 | 0.53 | 0.05 | 0.07 | 13.0 | 0.0 | 0.6 | 0.00 | 0.10 | 0.00 |
| G-712-160 | 18.2 | 68.6 | 1.04 | 0.05 | 0.06 | 9.3 | 0.0 | 0.0 | 2.63 | 0.15 | 0.00 |
| G-808-80 | 20.9 | 65.6 | 1.05 | 0.05 | 0.07 | 10.7 | 0.0 | 0.0 | 1.52 | 0.12 | 0.00 |
| G-908-80 | 23.4 | 63.2 | 1.04 | 0.05 | 0.07 | 10.4 | 0.0 | 0.0 | 1.70 | 0.13 | 0.00 |
| G-1008-80 | 25.8 | 61.1 | 1.03 | 0.05 | 0.06 | 9.9 | 0.0 | 0.0 | 1.87 | 0.15 | 0.00 |

TABLE 10b-continued

Compositions of Table 10A in Percentage by Weight of Composition

| Mix ID | Cement | Sand | Color | HPMC | Fibers | Water | SBC | CaCl | NCA | HRWR | AEA |
|---|---|---|---|---|---|---|---|---|---|---|---|
| G-812-100 | 20.8 | 66.0 | 1.04 | 0.05 | 0.06 | 10.0 | 0.0 | 0.0 | 1.88 | 0.18 | 0.00 |
| G-912-100 | 23.3 | 63.5 | 1.04 | 0.05 | 0.06 | 9.8 | 0.0 | 0.0 | 2.11 | 0.20 | 0.00 |
| G-1012-100 | 25.9 | 60.7 | 1.04 | 0.05 | 0.06 | 9.7 | 0.0 | 0.0 | 2.34 | 0.22 | 0.00 |
| GS-700-10 | 18.8 | 65.6 | 1.07 | 0.08 | 0.07 | 12.5 | 1.9 | 0.0 | 0.00 | 0.00 | 0.01 |
| GS-800-10 | 21.6 | 61.8 | 1.08 | 0.08 | 0.07 | 13.3 | 2.2 | 0.0 | 0.00 | 0.00 | 0.01 |

Example 11

The compositions from Example 10 were evaluated for compressive strength using ASTM D4832 (psi) at 4 hours, 1 day, 7 days, and 28 days as disclosed in Table 11. In addition, the water to cement ratio (W/CM), unit weight (UW (pcfC) using ASTM C138, and spread (inches) using a ASTM D6103 were also measured. Notably, these compositions yield faster setting times as desired for faster installation and less traffic disruption to the general public, when backfilling trenches. The SBC accelerant results in faster times than conventional concrete admixtures.

TABLE 11

Measurements for compositions of the present invention.

| Mix ID | W/CM | UW (pcf) | Air (%) est | Spread (in) | 4 hour | 1 day | 7 day | 28 day | C940 Consol. % |
|---|---|---|---|---|---|---|---|---|---|
| G-600-FP | 0.93 | 121 | 9.8 | 10 | 0 | 198 | 850 | 1373 | 0 |
| G-650 | 0.78 | 119.5 | 13.9 | 9 | 0 | 399 | 1242 | 1659 | 0 |
| G-700 | 0.73 | 122.8 | 11.5 | 9 | 0 | 485 | 1503 | 2072 | 0 |
| G-750 | 0.68 | 122.1 | 12.2 | 9 | 0 | 723 | 1790 | 2482 | 0 |
| G-800 | 0.63 | 122.9 | 12.1 | 9 | 0 | 822 | 1974 | 2745 | 0 |
| 600-CC-2 | 0.90 | 122.0 | 10.1 | 9.5 | 32 | 394 | 960 | 1235 | 0 |
| G-650-CC | 0.78 | 122.9 | 10.5 | 9.5 | 33 | 575 | 1210 | 1717 | 0 |
| G-700-CC | 0.73 | 122.9 | 10.6 | 9.5 | 56 | 606 | 1297 | 1796 | 0 |
| G-750-CC | 0.68 | 122 | 12 | 9.5 | 104 | 781 | 1440 | 1986 | 0 |
| G-800-CC | 0.63 | 123.1 | 11.3 | 9.5 | 134 | 868 | 1582 | 2193 | 0 |
| GA-700-198 | 0.66 | 115.8 | 20 | 8.5 | 200 | 850 | 1330 | 1710 | 0 |
| GA-700-256 | 0.66 | 115 | 20 | 8.5 | 175 | 770 | 1305 | 1625 | 0 |
| GA-700-WR | 0.70 | 116.3 | 18.5 | 10 | 200 | 780 | 1490 | 1850 | 0 |
| GA-700-1.5 | 0.70 | 122.5 | 12.5 | 11 | 175 | 995 | 1862 | 2538 | 0.25 |
| GA-700-1.0 | 0.70 | 124 | 10 | 11 | 186 | 1032 | 2274 | 3219 | 1.25 |
| GA-700-3 | 0.69 | 123.6 | 11 | 10 | 24 | 1206 | 2394 | 2857 | 0 |
| GA-700-6 | 0.69 | 124 | 11 | 10 | 156 | 1202 | 2340 | 2907 | 0 |
| G-712-160 | 0.51 | 121 | 17.2 | 10 | 8 | 1010 | 2143 | 2215 | 0 |
| G-808-80 | 0.51 | 118.9 | 19 | 10 | 110 | 1242 | 2270 | 2687 | 0 |
| G-812-100 | 0.48 | 121.8 | 17 | 10 | 104 | 1542 | 2810 | 3364 | 0 |
| G-908-80 | 0.45 | 121.6 | 17.2 | 10 | 109 | 1745 | 3430 | 4149 | 0 |
| G-912-100 | 0.42 | 123.9 | 15.5 | 10 | 135 | 1810 | 3770 | 4678 | 0 |
| G-1008-80 | 0.38 | 121.7 | 18 | 10 | 208 | 2711 | 3878 | 4630 | 0 |
| G-1012-100 | 0.38 | 121.4 | 18 | 12 | 102 | 2614 | 3650 | 4623 | 0 |
| GS-700-10 | 0.61 | 119.1 | 16.2 | 10 | 76 | 500 | 955 | 1272 | 0 |
| GS-800-10 | 0.56 | 120.2 | 14.5 | 11 | 149 | 797 | 1403 | 1807 | 0 |

The invention claimed is:

1. A method for filling a void with a high-strength flowable fill composition comprising:
   (a) mixing a composition, the composition comprising:
   between 55% and 75% aggregate by weight of the composition;
   between 10% and 25% cement by weight of the composition;
   between 5% and 20% water by weight of the composition;
   between 0.01% and 2.0% polymer by weight of the composition; and
   between 0.01% and 1.0% fibers by weight of the composition;
   the composition having a compressive strength of between 300 psi and 3000 psi after 1 day, a compressive strength of between 900 psi and 4000 psi after 7 days, and a compressive strength of between 1200 psi and 5000 psi after 28 days; and
   (b) filling the void with the composition.

2. The method of claim 1, wherein the aggregate is between 60% and 70% by weight.

3. The method of claim 1, wherein the aggregate is sand.

4. The method of claim 1, wherein the cement is Portland cement.

5. The method of claim 4, wherein the Portland cement is between 15% and 25% by weight.

6. The method of claim 1, further comprising between 0.25% and 8% accelerant by weight of the composition.

7. The method of claim 6, wherein the accelerant is calcium chloride, non-chloride accelerator, sodium bicarbonate, or a combination thereof.

8. The method of claim 7, wherein the accelerant is calcium chloride.

9. The method of claim 1, wherein the water is between 8% and 15% by weight.

10. The method of claim 1, wherein the composition further comprises a coloring agent is-between 0.3% and 2.0% by weight of the composition.

11. The method of claim 1, wherein the polymer is between 0.03% and 0.1% by weight of the composition.

12. The method of claim 1, wherein the polymer is hydroxypropyl methylcellulose.

13. The method of claim 1, wherein the fibers are between 0.04% and 0.09% by weight of the composition.

14. The method of claim 1, wherein the fibers are polypropylene fibers.

15. The method of claim 1, wherein the fibers are between 0.5 inches and 1.0 inches long.

16. The method of claim 1, wherein the composition further comprises a water-proofing admixture, water-repelling admixture, or a combination thereof.

17. The method of claim 16, wherein the water-proofing admixture, water-repelling admixture, or combination thereof reduces efflorescence.

18. A method for filling a void with a high-strength flowable fill composition comprising:
(a) mixing a composition, the composition consisting essentially of:
between 55% and 75% aggregate by weight of the composition;
between 10% and 25% cement by weight of the composition;
between 5% and 20% water by weight of the composition;
between 0.05% and 5.0% coloring agent by weight of the composition;
between 0.01% and 2.0% polymer by weight of the composition; and
between 0.01% and 1.0% fibers by weight of the composition;
the composition having a compressive strength of between 300 psi and 3000 psi after 1 day, a compressive strength of between 900 psi and 4000 psi after 7 days, and a compressive strength of between 1200 psi and 5000 psi after 28 days; and
(b) filling the void with the composition.

19. A method of filling a void with a high-strength flowable fill composition comprising:
(a) mixing a composition, the composition comprising:
between 60% and 90% aggregate by weight of the composition;
between 3% and 25% cement by weight of the composition;
between 5% and 25% water by weight of the composition;
between 0.01% and 2.0% polymer by weight of the composition; and
between 0.01% and 1.0% fibers by weight of the composition;
the composition having a compressive strength of between 10 psi and 500 psi after 1 day, a compressive strength of between 300 psi and 1300 psi after 7 days, and a compressive strength of between 1000 psi and 2500 psi after 28 days; and
(b) filling the void with the composition.

20. The method of claim 19,
wherein the aggregate includes sand and the aggregate is between 60% and 75% by weight of the composition;
wherein the cement is Portland cement and is between 10% and 20% by weight of the composition;
wherein the water is between 12% and 18% by weight of the composition;
wherein the polymer includes hydroxypropyl methylcellulose and the polymer is between 0.04% and 0.07% by weight of the composition; and
wherein the fibers include polypropylene fibers and the fibers are between 0.05% and 0.09% by weight of the composition.

\* \* \* \* \*